March 12, 1935.  H. N. COMINS  1,994,169
FLUID SEAL
Filed March 27, 1933
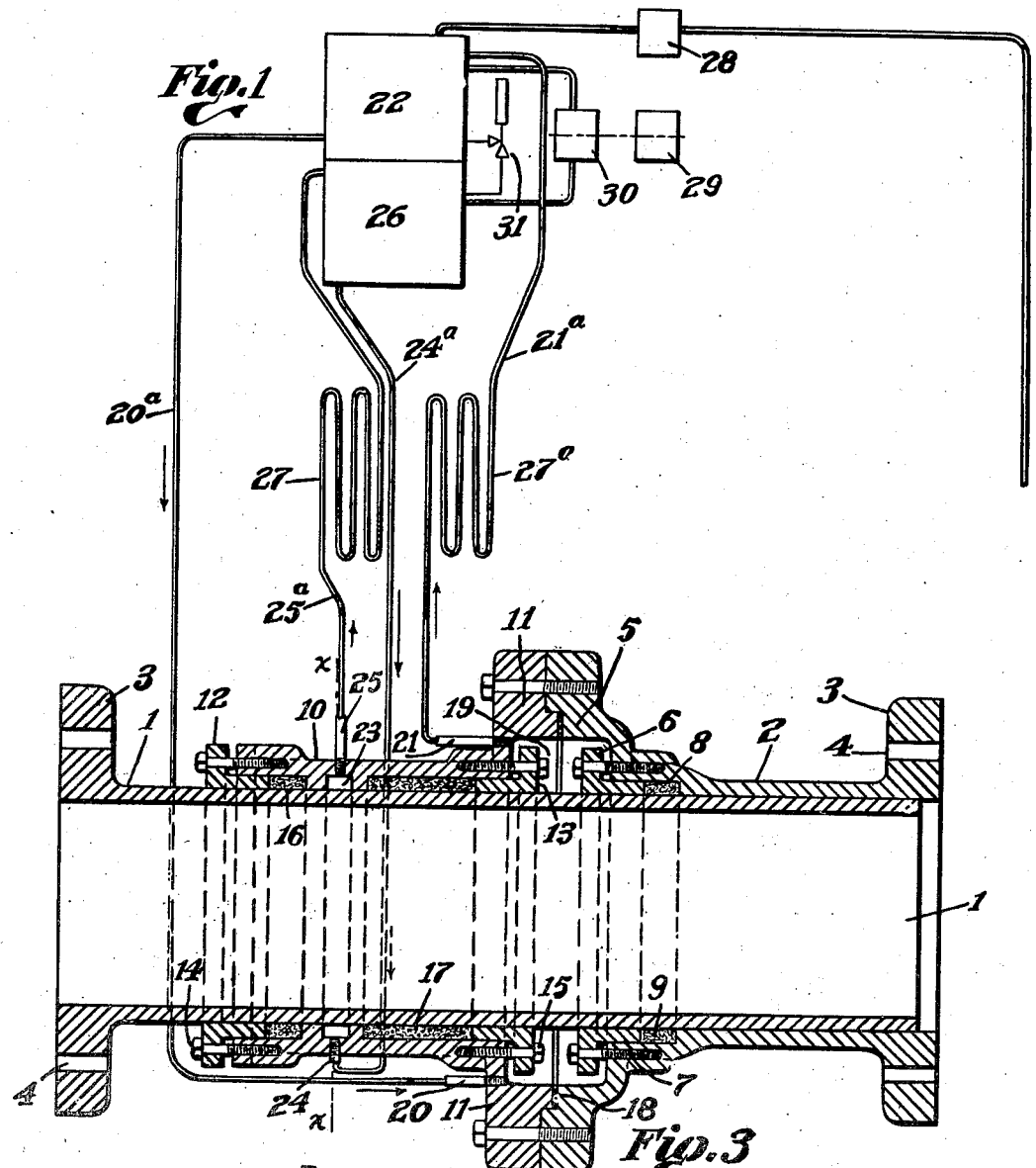
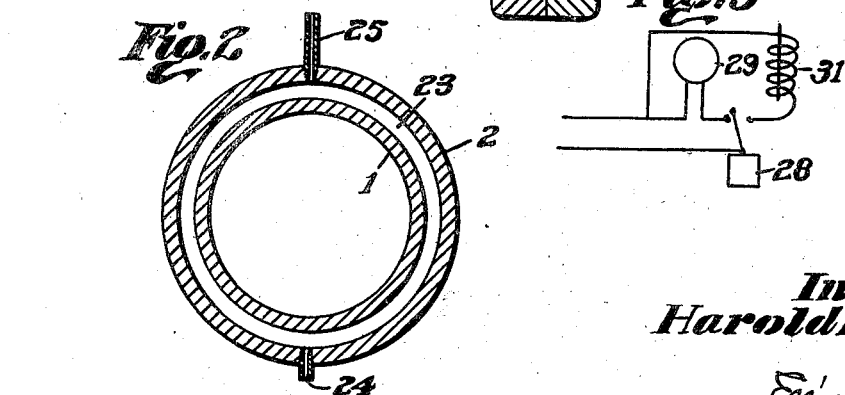
Inventor
Harold N. Comins
By Ellis Spear Jr.
Attorney Patented Mar. 12, 1935

1,994,169

UNITED STATES PATENT OFFICE 1,994,169

FLUID SEAL

Harold N. Comins, Wakefield, Mass.

Application March 27, 1933, Serial No. 662,928

9 Claims. (Cl. 285—109)

This invention relates to an improvement in pipe expansion joints.

The usual practice for providing for the effects of expansion due to temperature changes in high pressure and high temperature pipe lines is to have a sufficient number of bends in the pipe to provide flexibility that the excessive strains may be taken away from the pipe joints and the connecting equipment. Where the runs of pipe are relatively short and there are more or less branches from the line, there is probably no better way to provide for expansion than to maintain the whole system flexible by means of pipe bends. In the case of a run of pipe of considerable length and no branches, where the free movement of the pipe is permissible, except at the ends, the use of a telescopic expansion joint such as I propose would have the following advantages:

1. More direct flow.
2. Less material, pipe fabrication, and space required.
3. Less radiating surfaces and consequent heat loss.
4. Greater simplicity of anchorage and support.
5. Would make the use of tunnels and underground conduits more suitable for hot pipes.

There has been for years various types of telescopic pipe expansion joints which, inherently, have the advantages mentioned, but on account of their excessive leakage are not suitable for high pressure work.

By means of a controlled pressure hydraulic seal, as hereinafter described, I propose to make a telescopic pipe expansion joint which is suitable for any pressure. I provide an expansion joint with two annular spaces about the pipe. These are separated from each other, the atmosphere and the connecting pipe by stuffing boxes. In these spaces I use a viscous fluid with a boiling point of between 500° or 600° F. and a viscosity about one hundred times that of water. In the annular space near the connecting pipe, the viscous fluid is maintained near the pressure of the connecting pipe. Thus, there is no tendency for leakage from the pipe to the annular space that the stuffing box would not effectively prevent. To maintain the viscosity of the fluid I provide cooling coils. In the annular space in closer proximity to the atmosphere, the viscous fluid is maintained near atmospheric pressure. Thus the stuffing box will adequately prevent any tendency to leak at this point.

The result of this arrangement is that the leakage will be only of the viscous fluid from one annular space to the other, since the difference in pressure in the two annular spaces is nearly equal to the difference between the atmospheric pressure and the pressure in the connecting pipe. Because of the effectiveness of the stuffing boxes and of the viscosity of the fluid, the leakage is small. I control the pressure in these annular spaces by a differential pressure gauge. When, because of leakage, the pressure in the annular space on the high pressure side has become lowered, the gauge closes a switch starting a motor pump which transfers the leakage from the low to the high pressure space. When the pressure is again high enough, the pressure gauge acts again, shutting off the motor pump.

When the pipe line goes out of service, the pressure in the fluid system becomes greater than that in the pipe. This causes the pressure gauge to close a circuit which operates a solenoid operated valve which discharges the fluid from the high pressure side to the low pressure side until the gauge again causes the valve to close when the pressures are balanced.

This type of pipe expansion joint is suitable for any pressure for which pipe is used and for temperatures up to 700° or 800° F. and perhaps higher. A single joint can take care of the expansion of a pipe line of considerable length. The force necessary to move the sliding element would not cause excessive strain on the connecting equipment. The leakage of the material carried in the pipe and of the sealing fluid is effectively prevented.

In the drawing, I have shown an embodiment of my invention and throughout the drawing and specification like reference numerals are employed to designate corresponding parts.

Fig. 1 is a view partly in longitudinal section of my hydraulic expansion joint showing the means of controlling the pressure in the annular spaces.

Fig. 2 is a view in cross section of the line x—x in Fig. 1, and

Fig. 3 is a diagram of the electric circuit.

For my invention, I provide a sliding element 1 adapted to fit in the outer casing 2. The sliding element 1 and the casing 2 are provided with flanges 3 with suitable bolt holes 4 so that connections may be made with the pipe line.

The casing 2 has an outturned flange portion 5 at the outer end and has a packing ring 6 set up by the bolts 7 which cause the desired compression within the space 8 of suitable packing 9 with which it is filled.

The outer casing 10 is formed similarly to the casing 2 and has the outturned flange portion 11 at the outer end and has packing rings 12 and 13 suitably set up by the bolts 14 and 15 on the packing within the spaces 16 and 17. The two casings 2 and 10 are securely fastened together and sealed by the gasket 18.

The flange 11 of the casing 12 and the flange 5 of the casing 2 are recessed forming an annular space or recess 19 with a viscous fluid inlet 20 and viscous fluid outlet 21 through the shoulder of the casing 10. The fluid inlet 20 and the outlet 21 are connected by pipes 20ª and 21ª with the high pressure storage chamber 22.

Within the outer casing 10 there is a second annular space or recess 23 with an inlet 24 and an outlet 25. These are connected by pipes 24ª and 25ª with the low pressure storage tank 26.

The return feed line 25ª from the annular space 23 and the return feed line 21ª from the high pressure annular space 19 pass through cooling coils 27 and 27ª.

I provide a differential pressure gauge 28, a motor 29 and a pump 30.

When, because of leakage from the high pressure space or recess 19 to the low pressure space 23 the pressure in the space 19 is lowered a certain amount, the pressure gauge closes a switch starting the motor pump which transfers the leakage back from the low pressure chamber 26 to the high pressure chamber 21 until the pressure is suitably balanced.

If the pipe line goes out of service or the pressure therein is lowered, the pressure in the high pressure annular space is greater than in the connecting pipe. This causes the pressure gauge 28 to close a circuit permitting a solenoid operated valve 31 of standard type to open, discharging the fluid from the high pressure chamber 22 to the low pressure chamber 26 until pressures are balanced.

The same function performed by the differential control gauge, motor pump, and the solenoid operated valve may be accomplished by an arrangement of pistons actuated by direct contact with the substance being carried in the pipe. This would require a suitable arrangement of chambers, piping connections and valves.

Where steam is being carried in the pipe and there is available a source of high pressure drip or other water under the same pressure as the steam pipe, this water may be used in place of a more viscous fluid. The leakage from one annular space to the other may be piped away to the low pressure drip system or to waste at atmospheric pressure. In such use, the pump and control arrangements are not necessary.

If waste products are to be carried, since the requirement of the expansion joint as far as leakage is concerned is to prevent the leakage from causing a hazardous or dirty condition, the use of the fluid, the cooling coils, storage chamber, control gauge, motor pump, one annular space, and one stuffing box may be eliminated. The sliding element is left with one annular space separated from the atmosphere and the connecting pipe by stuffing boxes. The pressure in the annular space is maintained at atmosphere by a vent and the leakage, therefore, limited to occur between the connecting pipe and the annular space. This leakage is disposed of by a drain connection with a sewer.

An expansion joint with the same elements as described in the previous paragraph may also be used for low pressure pipe lines, with the exceptions that there would be no vent or drain and a viscous fluid would be used in the annular space with a connection from a weighted piston arrangement, to maintain the fluid pressure at midway between the pressure of the connecting pipe and the atmosphere.

While my invention is primarily adapted for use with expansion joints, it will be seen that it is equally adapted for use with any enclosed bearing or shaft subjected to high pressure on one side and a lower pressure on the other side.

Various changes and modifications in my expansion joint may be made without departing from the spirit of my invention if within the limits of the appended claims.

What I therefore claim and desire to secure by Letters Patent is:

1. An expansion joint for hydraulic or like pipe lines comprising a sliding member and a casing having a zone of sliding movement relative to each other, said casing having an annular high pressure fluid recess within the zone of sliding movement, said casing having a second annular fluid recess spaced from the first named recess and enclosing the casing in said zone towards the low pressure side thereof, packings disposed on each side of said recesses, sources of supply for a viscous fluid seal including a high pressure supply connected in circuit to the first named recess and a low pressure supply similarly connected to the low pressure sealing recess, radiators in said fluid supply circuits in the return sides thereof, a connection for leakage transfer from said low pressure supply to said high pressure supply, and means for maintaining differential pressure in the two fluid systems.

2. An expansion joint for hydraulic or like pipe lines comprising a sliding member and a casing having a zone of sliding movement relative to each other, said casing having an annular high pressure fluid recess within the zone of sliding movement, said casing having a second annular fluid recess spaced from the first named recess and enclosing the casing in said zone towards the low pressure side thereof, packings disposed on each side of said recesses, sources of supply for a viscous fluid seal including a high pressure supply connected in circuit to the first named recess and a low pressure supply similarly connected to the low pressure sealing recess, radiators in said fluid supply circuits in the return sides thereof, a connection for leakage transfer from said low pressure supply to said high pressure supply, means for maintaining differential pressure in the two fluid systems by transfer of leakage from the high pressure system back to said high pressure system from said low pressure system, including a differential pressure control effective upon loss of predetermined differential pressures to cause the return of fluid from the low pressure supply to the high pressure recess, a connection between said high pressure supply and said low pressure supply, and a valve in connection influenced by said differential control to create balanced pressure in said recesses when the pipe line is not in use.

3. An expansion joint for hydraulic or like pipe lines comprising a sliding member and a casing having a zone of sliding movement relative to each other, said casing having an annular high pressure fluid recess within the zone of sliding movement, said casing having a second annular fluid recess spaced from the first named recess and enclosing the casing in said zone towards the low pressure side thereof, packings disposed on each side of said recesses, sources of supply for a viscous fluid seal including a high pressure supply connected in circuit to the first named recess and a low pressure supply similarly connected to the low pressure sealing recess, radiators in said fluid supply circuits in the return sides thereof, and means for maintaining the pressure in said high pressure recess in sealing relation to the pressure within said pipe line.

4. An expansion joint for hydraulic or like pipe lines comprising a sliding member and a casing having a zone of sliding movement relative to each other, said casing having an annular high pressure fluid recess within the zone of sliding movement, said casing having a second annular fluid recess spaced from the first named recess and enclosing the casing in said zone towards the low pressure side thereof, sources of supply for a viscous fluid seal including a high pressure supply connected in circuit to the first named recess and a low pressure supply similarly connected to the low pressure sealing recess, a valve controlled pipe from said high pressure supply to said low pressure supply, a valve controlled leakage transfer connection from the low pressure supply to the high pressure supply, and means for maintaining differential pressures in the two fluid systems by transfer of leakage from the high pressure system to the low pressure system, including a differential control gauge effective upon loss of the predetermined differential pressures to cause the return of fluid leakage from the low pressure supply to the high pressure supply and to decrease the pressure in said high pressure recess when the pressure therein is greater than that within said joint.

5. In a system having a high and a low pressure side, an expansion joint having a zone of relative sliding movement, a liquid seal in said joint adjacent the high pressure end thereof maintained at relatively pipe line pressure, and a liquid seal in said joint adjacent the low pressure end thereof maintained at relatively atmospheric pressures, and means for increasing and decreasing the pressure of said high pressure seal to balance varying pipe line pressures.

6. In a system having a high and a low pressure side, an expansion joint having a zone of relative sliding movement, a liquid seal in said joint adjacent the high pressure end thereof maintained at relatively pipe line pressure, a liquid seal in said joint adjacent the low pressure end thereof maintained at relatively atmospheric pressures, and means for transferring the sealing fluid from the low pressure side to the high pressure side to maintain differential pressures.

7. In a device of the class described having a high and low pressure side, a pair of relatively movable members having suitably contacting surface portions intermediate the high and low pressure sides, an annular fluid seal adjacent the high pressure side of said contacting portions, means for maintaining the high pressure therein and a separate fluid seal adjacent the low pressure side of said means for maintaining the low pressure therein, and means for transferring the sealing fluid from the low pressure seal to the high pressure seal to maintain differential pressures therein.

8. In a system having a high and a low pressure side, an expansion joint having a zone of relative sliding movement, a liquid seal in said joint adjacent the high pressure end thereof maintained at relatively pipe line pressure, a liquid seal in said joint adjacent the low pressure end thereof maintained at relatively atmospheric pressures, a pump adapted to transfer fluid leakage to maintain differential pressures and a valve between said high pressure seal and said low pressure seal adapted to release said pressure in said high pressure seal to maintain differential pressures, a motor to operate said pump, a solenoid in control of said valve, and a pressure gauge and a circuit including a switch controlled by said gauge, and said switch being adapted to include said motor or said solenoid in said circuit.

9. In a system having a high and a low pressure side, an expansion joint having a zone of relative sliding movement, a liquid seal in said joint adjacent the high pressure end thereof maintained at relatively pipe line pressures, a liquid seal in said joint adjacent the low pressure end thereof maintained at relatively atmospheric pressures, means for decreasing the pressure of said high pressure seal to balance reduced pipe line pressures, and means for transferring under pressure the fluid leakage from the low pressure seal to the high pressure seal to balance increased pipe line pressures and decreased pressure in said high pressure seal.

HAROLD N. COMINS.